(12) United States Patent
Shaw et al.

(10) Patent No.: US 8,029,677 B2
(45) Date of Patent: Oct. 4, 2011

(54) WATER PURIFICATION METHOD

(76) Inventors: Mark D. Shaw, Ponte Vedra Beach, FL (US); J. Tad Heyman, Atlantic Beach, FL (US)

(*) Notice: Subject to any disclaimer, the term of this patent is extended or adjusted under 35 U.S.C. 154(b) by 0 days.

(21) Appl. No.: 12/924,119

(22) Filed: Sep. 21, 2010

(65) Prior Publication Data
US 2011/0011809 A1    Jan. 20, 2011

Related U.S. Application Data

(62) Division of application No. 11/638,842, filed on Dec. 14, 2006, now Pat. No. 7,828,967.

(60) Provisional application No. 60/750,260, filed on Dec. 14, 2005.

(51) Int. Cl.
*C02F 1/50* (2006.01)

(52) U.S. Cl. .................. 210/755; 210/764; 422/28

(58) Field of Classification Search ............. 210/764
See application file for complete search history.

(56) References Cited

U.S. PATENT DOCUMENTS

| | | |
|---|---|---|
| 3,865,728 A | 2/1975 | Abbott et al. |
| 4,325,823 A | 4/1982 | Graham |
| 4,396,512 A | 8/1983 | Beauman et al. |
| 4,800,018 A | 1/1989 | Moser |
| 5,011,602 A | 4/1991 | Totani et al. |
| 5,122,272 A | 6/1992 | Iana et al. |
| 6,251,417 B1 | 6/2001 | Shiau et al. |
| 6,383,273 B1 | 5/2002 | Kepner et al. |
| 6,780,332 B2 | 8/2004 | Shiau et al. |
| 6,968,956 B2 | 11/2005 | Iwasaki |
| 6,994,794 B2 | 2/2006 | Hansen et al. |
| 7,828,967 B2 * | 11/2010 | Shaw et al. ............. 210/209 |
| 2004/0149634 A1 | 8/2004 | Hughes |
| 2005/0029195 A1 | 2/2005 | Gibson et al. |
| 2005/0126606 A1 | 6/2005 | Goedhart et al. |
| 2006/0260996 A1 | 11/2006 | Brownstein et al. |

* cited by examiner

*Primary Examiner* — Peter A Hruskoci
(74) *Attorney, Agent, or Firm* — Thomas C. Saitta

(57) ABSTRACT

A water purification method and devices, and in particular a purification method effective against microbes, that uses a silane-based antimicrobial, and in particular the AEGIS MICROBE SHIELD antimicrobial, where the antimicrobial is embedded, coated, or otherwise permanently applied to a substrate or carrier, such as a solid, a porous solid, fibers or the like. A volume of microbe contaminated water is exposed to the antimicrobial carrier for sufficient residence time such that sufficient quantities of microbes are eradicated and the water is made potable. The antimicrobial carrier may be an object suspended or placed into a container or reservoir for the water, or the antimicrobial carrier may comprise the container or reservoir itself. Particulate filters or the like may also be combined with the antimicrobial container to remove other undesirable contaminants.

20 Claims, 4 Drawing Sheets

WATER PURIFICATION METHOD

This application is a divisional application of U.S. Non-Provisional patent application Ser. No. 11/638,842, filed Dec. 14, 2006, now U.S. Pat. No. 7,828,967, claiming the benefit of U.S. Provisional Patent Application Ser. No. 60/750,260, filed Dec. 14, 2005.

BACKGROUND OF THE INVENTION

This invention relates generally to the field of water purification, and more particularly to antimicrobial systems for the purification of drinking water.

Obtaining potable water in many third world countries is often difficult, due to the lack of proper water treatment facilities. The drinking of contaminated water results in serious health problems and untold number of preventable deaths. Because the development of large-scale water purification systems is an expensive undertaking, there is an extreme need for simple methodologies and devices that purify water on a small scale in a batch or single use approach, in quantities of a relatively small number of liters or less, as opposed to the more costly continuous processing systems that are commonplace in developed countries. These simple purification methodologies and devices also need to operate without any power sources, need to be easily constructed and preferably of a size that makes for easy portability, such that they can be utilized anywhere and at anytime.

Such water purification methodologies and devices can also be applied to any remote situation where potable water is not available, such as for backcountry hikers or the like. In addition, there are many situations where potable water is stored in relatively large containers or tanks over significant time periods, such as in a recreational travel vehicle or boat, for example, and these tanks may become contaminated with microbes and other undesirable biological organisms over time, damaging the quality or safety of the water and creating the need for a simple purification system.

One common solution to these problems involves the use of portable pass-through filtering systems, but such systems can be relatively costly, especially those that have sufficient antimicrobial efficiencies, and may require frequent replacement or cleaning of the filters. Furthermore, filter systems do not address the problem of microbial build-up over time in reservoir tanks or multiple use containers.

A common simple approach to purification of water is to infuse iodine, chlorine or similar soluble antimicrobial substances into the water, but these substances ruin the taste of the water and may even need to be removed prior to drinking the water by subsequent filtration if the concentrations are too high.

In the area of antimicrobials not directly related to water purification, it is known to utilize antimicrobial substances that are embedded, bound, contained, coated, etc., onto substrates. The typical systems utilize either silver-based or triclosan-based antimicrobials, and address concerns of microbe contamination or build-up on the substrates themselves. For example, it is known to embed antimicrobials into fibers that are then woven into clothing, bed linens, hospital gowns, etc., in order to preclude the growth of microbes for sanitation and odor control purposes.

A third type of antimicrobial was developed in the 1970's by Dow Corning Corporation, formerly sold under the brand SYLGARD, and is now known under the brand AEGIS MICROBE SHIELD. This silane-based antimicrobial molecule is 3-(trimethoxysilyl) propyldimethyloctadecyl ammonium chloride and has been applied to fabrics, hosiery, carpets, surgical drapes, orthopedic soft goods, aquarium filter floss, uniforms, upholstery, foams and other substrates to prevent defacement, deterioration and odor caused by microorganisms. The molecule electrostatically and covalently bonds impermanent manner to surfaces.

The silver-based and triclosan-based antimicrobials present problems for use in the purification of water for drinking purposes, since both operate by dissolving or leaching components into the water. The silver-based antimicrobials release ionic free radicals that react with cell DNA to disrupt critical life processes within the cell. The triclosan-based antimicrobials release toxic bis-chlorinated phenol (PCB) for consumption or cellular disruption, causing lethal mutations within the cell. Such systems cannot be used to create potable water. In contrast, the silane-based antimicrobial does not leach or migrate into water to destroy the microbes. Instead, the microbes are attracted to the antimicrobial by charge differential and destroyed by physical puncturing of the cell membrane.

Known uses of the silane-based AEGIS MICROBE SHIELD antimicrobial have been limited to protection of the substrates from microbial contamination and growth, even when used in water filtering applications. In other words, the antimicrobial is used to prevent microbial contamination on the filter material itself, and does not act to purify the water since the residence time of contact between the water and the antimicrobial is too short for destruction of sufficient concentrations of microbes. It has been discovered, however, that exposure of a quantity of microbe contaminated water to an efficacious amount of silane-based AEGIS MICROBE SHIELD antimicrobial incorporated on or in a substrate in a manner where it is exposed to the water will result in eradication of the microbes, provided that sufficient surface area and exposure time is present.

It is an object of this invention to provide a water purification method, system and devices which can safely and quickly purify water in batches by destroying microbes, in a manner that is easy, portable, safe and requires no power, utilizing a silane-based antimicrobial. It is a further object to provide such a water purification method, system and devices that can be utilized with either personal size containers, such as a canteen or a bottle, as well as with larger water reservoirs, such as a barrel or tank.

SUMMARY OF THE INVENTION

The invention comprises a water purification method and devices, and in particular a purification method effective against microbes, that uses a silane-based antimicrobial, and in particular the AEGIS MICROBE SHIELD antimicrobial, where the antimicrobial is embedded, coated, or otherwise permanently applied to a substrate or carrier, such as a solid, a porous solid, fibers or the like. The silane-based anti-microbial is chemically-bound to the carrier and non-leaching in water. A volume of microbe-contaminated water is exposed to the antimicrobial carrier for sufficient residence time such that sufficient quantities of microbes are eradicated and the water is made potable. The antimicrobial carrier may be an object suspended or placed into a container or reservoir for the water, or the antimicrobial carrier may comprise the container or reservoir itself. Particulate filters or the like may also be combined with the antimicrobial container to remove other undesirable contaminants.

DETAILED DESCRIPTION OF THE INVENTION

With reference to the drawings, the invention will now be described in detail with regard for the best mode and the preferred embodiment. In general, the invention is a method, system, device and apparatus for the antimicrobial purification of water, whereby microbe contaminated water can be made potable, using a chemically-bound, non-leaching, non-dissolving, silane-based antimicrobial agent, preferably 3-(trimethoxysilyl) propyldimethyloctadecyl ammonium chloride. The water is processed or purified in a batch mode, whereby individual quantities of water are purified, rather then in a continuous or pass-through mode.

Figure 4:
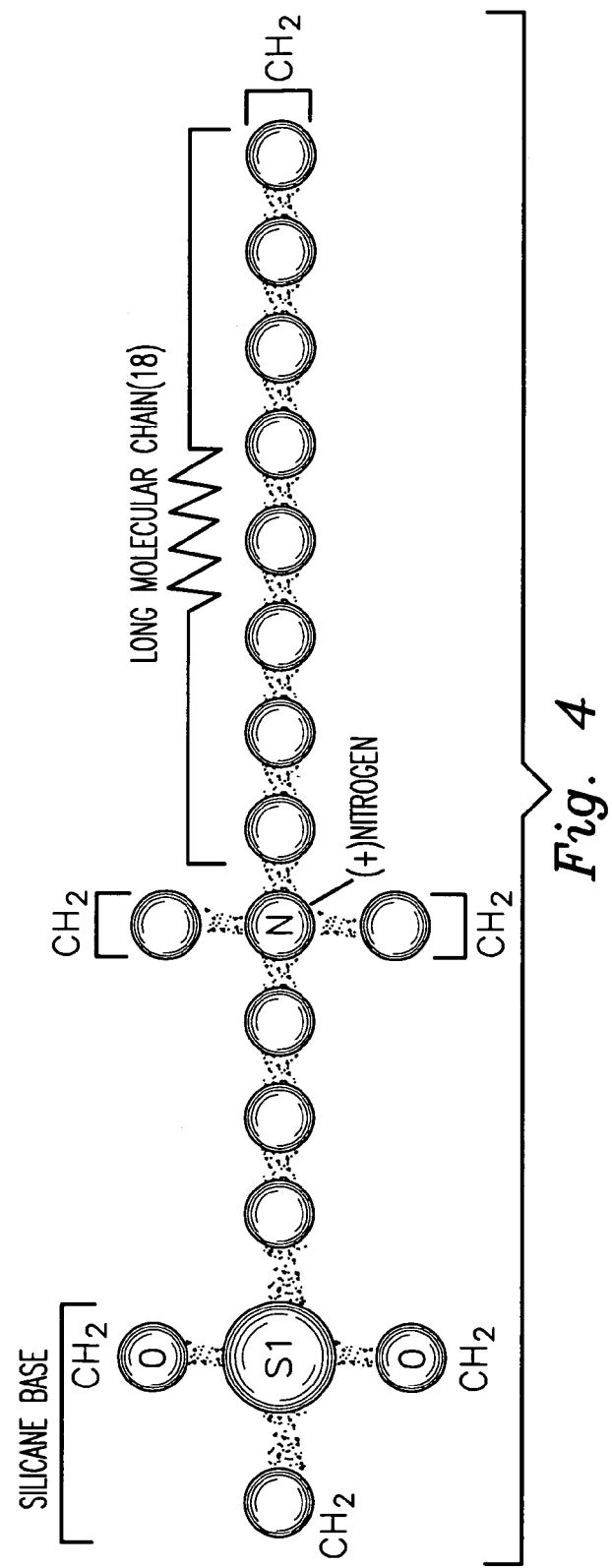
FIG. 4 is a molecular representation of the AEGIS MICROBE SHIELD antimicrobial, 3-(trimethoxysilyl) propyldimethyloctadecyl ammonium chloride.

The method of the invention comprises providing a substrate or carrier 11 having a relatively large surface area for contacting a given quantity of water 99, the carrier 11 presenting large numbers of a silane-based anti-microbial molecule, preferably 3-(trimethoxysilyl) propyldimethyloctadecyl ammonium chloride, commonly produced and marketed under the brand name AEGIS MICROBE SHIELD. The anti-microbial agent is permanently bonded to the carrier 11 in such a way that the silane-based molecules are exposed to and are readily contacted by the water to be treated. The molecular representation of 3-(trimethoxysilyl) propyldimethyloctadecyl ammonium chloride is shown in FIG. 4. This silane-based antimicrobial is embedded, coated, or otherwise permanently applied to the carrier or substrate 11 in known manner, dependent on the material of the chosen substrate, methodologies for such being known in the art. The silane-based antimicrobial molecules are electrostatically and covalently chemically bonded to the carrier 11 using a hydrolysis reaction, such that they are permanently bound to the carrier 11 and do not leach or migrate into the water. The carrier 11 may be provided on an immersion member 13 that is put into the water to be purified within a container or reservoir 12, or the carrier 11 may comprise the walls or other structural components of the container or reservoir 12 itself. The carrier 11 is preferably a non-woven fiber mass or a woven fabric composed of a large number of synthetic fibers, such that a large surface area and therefore a large number of the silane-based antimicrobial molecules are exposed for contact with the water 99.

With the contaminated water 99 in the container 12 and the silane-based antimicrobial molecules present and in contact with the water 99, the microbes are drawn to the silane-based antimicrobial molecules by electrostatic attraction or come into contact due to agitation or natural movement within the water 99. The exposed long molecular chain of each of the silane-based antimicrobial molecules acts in effect as a sword, physically puncturing the cell membrane and destroying the microbe. Since the silane-based antimicrobial agent is non-leaching and non-dissolving, there is no chemical action or exchange of ions resulting in reduced effectiveness over time or contamination of the water 99 by the released ions or chemical products. Because there is no molecular loss, the antimicrobial action of the silane-based antimicrobial is permanent and the effectiveness of the silane-based antimicrobial molecules are not diminished over repeated eradications. Since no leaching or migration of the silane-based antimicrobial molecules occurs, the antimicrobials do not contaminate the water 99. After sufficient time, dependent on the quantity of the water 99 being purified and the amount of surface area containing the silane-based antimicrobial molecules, the water 99 will be rendered potable. Agitation, stirring or the like may decrease the required residence time.

The water 99 may also be filtered using known filter mechanisms, preferably prior to the antimicrobial treatment to remove particulates and other types of contaminants.

The apparatuses or devices may comprise any combination of a standard container or reservoir 12, such as bottles, canteens, barrels or the like, with a carrier 11 bearing the permanently bonded, silane-based antimicrobial molecules. The carrier 11 may be attached to the containers or reservoirs 12, may comprise a portion of the container or reservoir 12, or may be deposited directly into the water 99 in non-attached manner. The containers or reservoirs 12 may be portable or may be incorporated into structures, vehicles, boats, etc.

Figure 1:
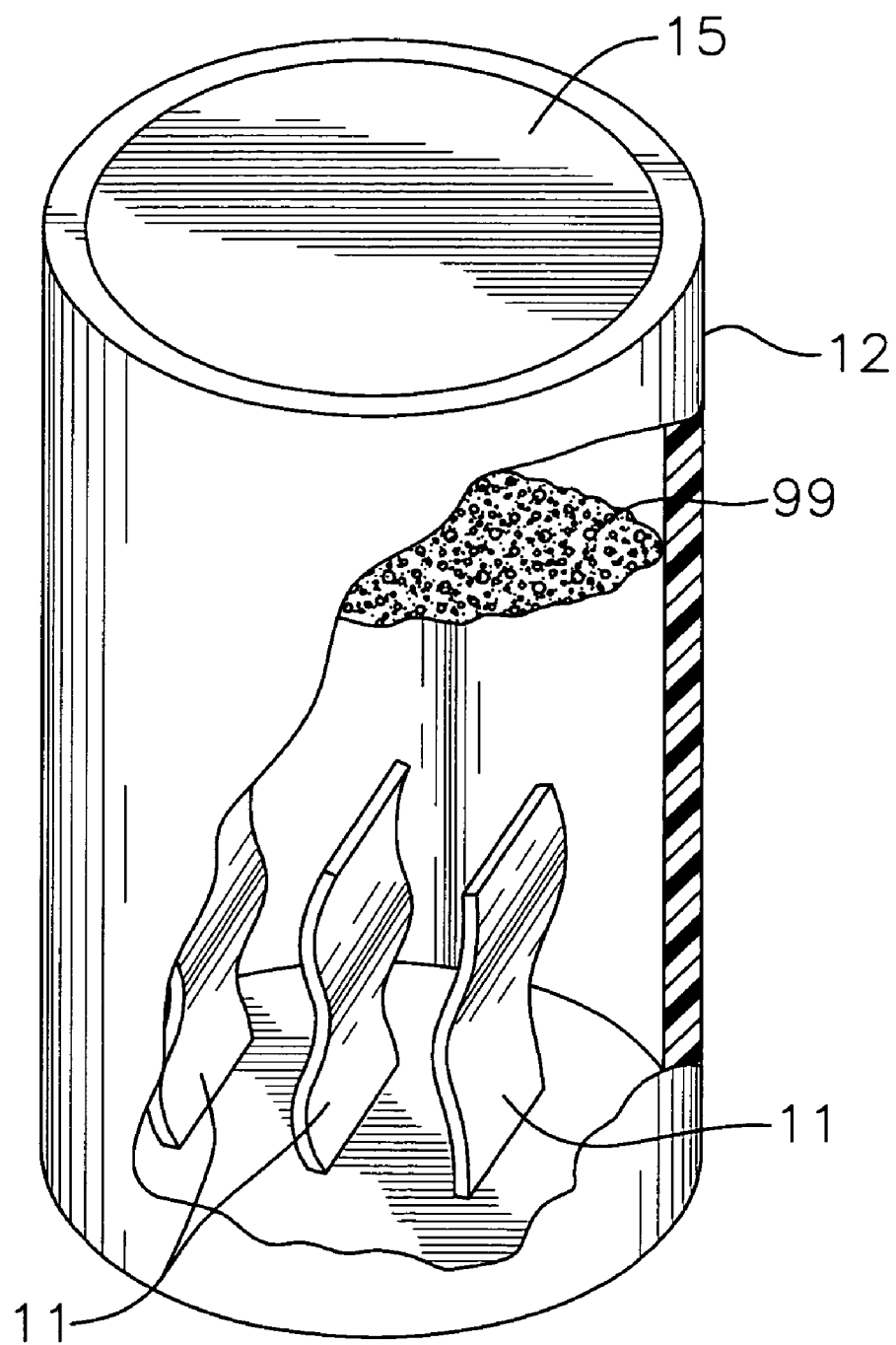
FIG. 1 is an illustration of a simple embodiment of the invention, showing an open-topped container with carrier substrates immersed in the water being purified, the carrier substrates bearing a silane-based, non-leaching antimicrobial agent.
Figure 2:
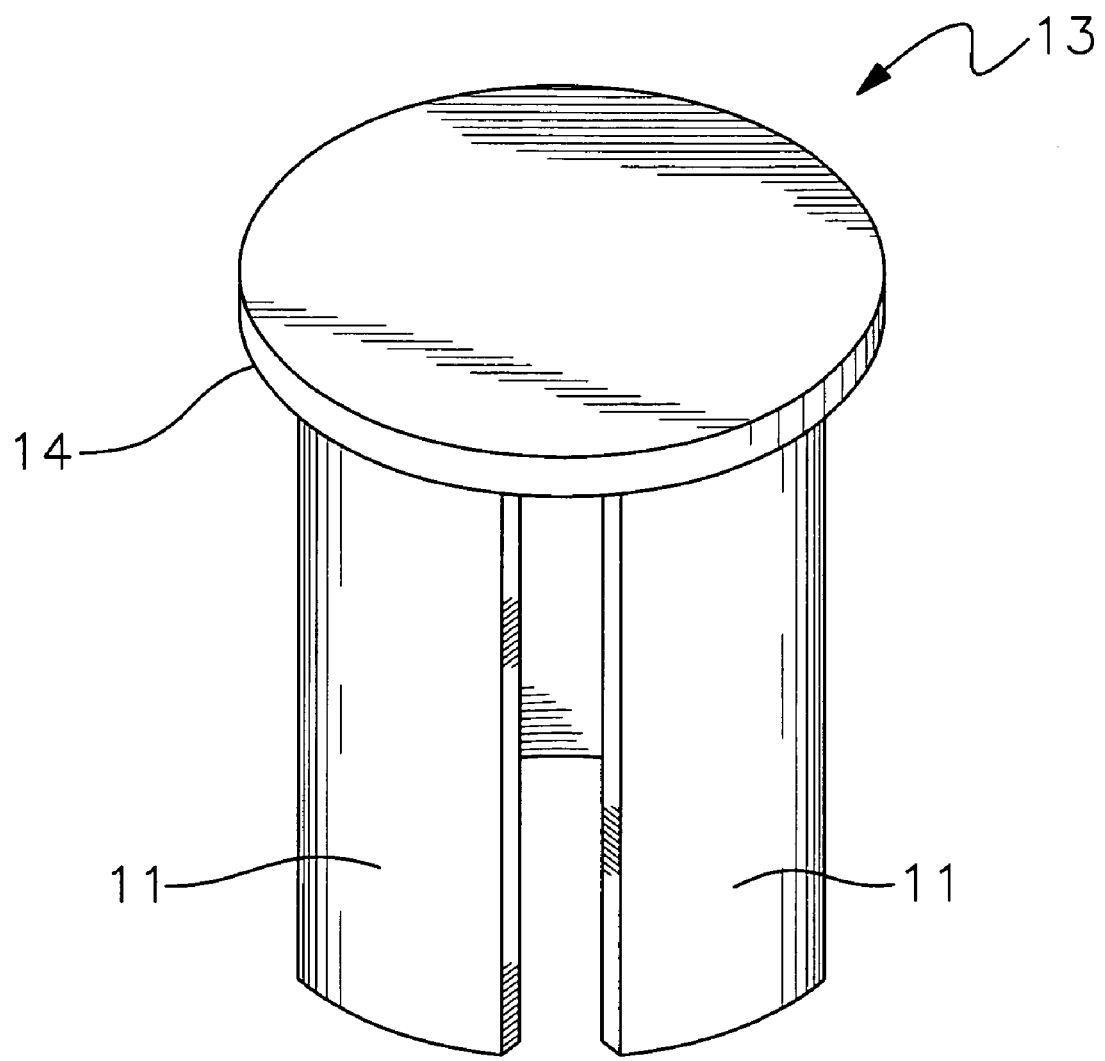
FIG. 2 is an illustration of a insertion member for placement into a quantity of water to be purified, the member having carrier substrates bearing a silane-based, non-leaching antimicrobial.

A simple open-topped container 12 is illustrated in FIG. 1, this being representative of a glass, bucket, barrel or the like. The carriers 11 are here depicted as non-woven or woven strips of synthetic fibers that are attached to the bottom of the container 12 and are free to move within the water 99 being purified. After the microbial contaminates have been killed, the water 99 is potable. An immersion member 13 suitable for use in any container 12 is illustrated in FIG. 2, the immersion member 13 having multiple non-woven or woven strips of synthetic fibers bearing the silane-based antimicrobial molecules. The body 14 of the immersion member 13 may be composed of a material that floats, in which case the carriers 11 will hang down into the water 99, or may be of a material that sinks, in which case the immersion member 13 will be inverted when it is placed into the container 12.

Figure 3:
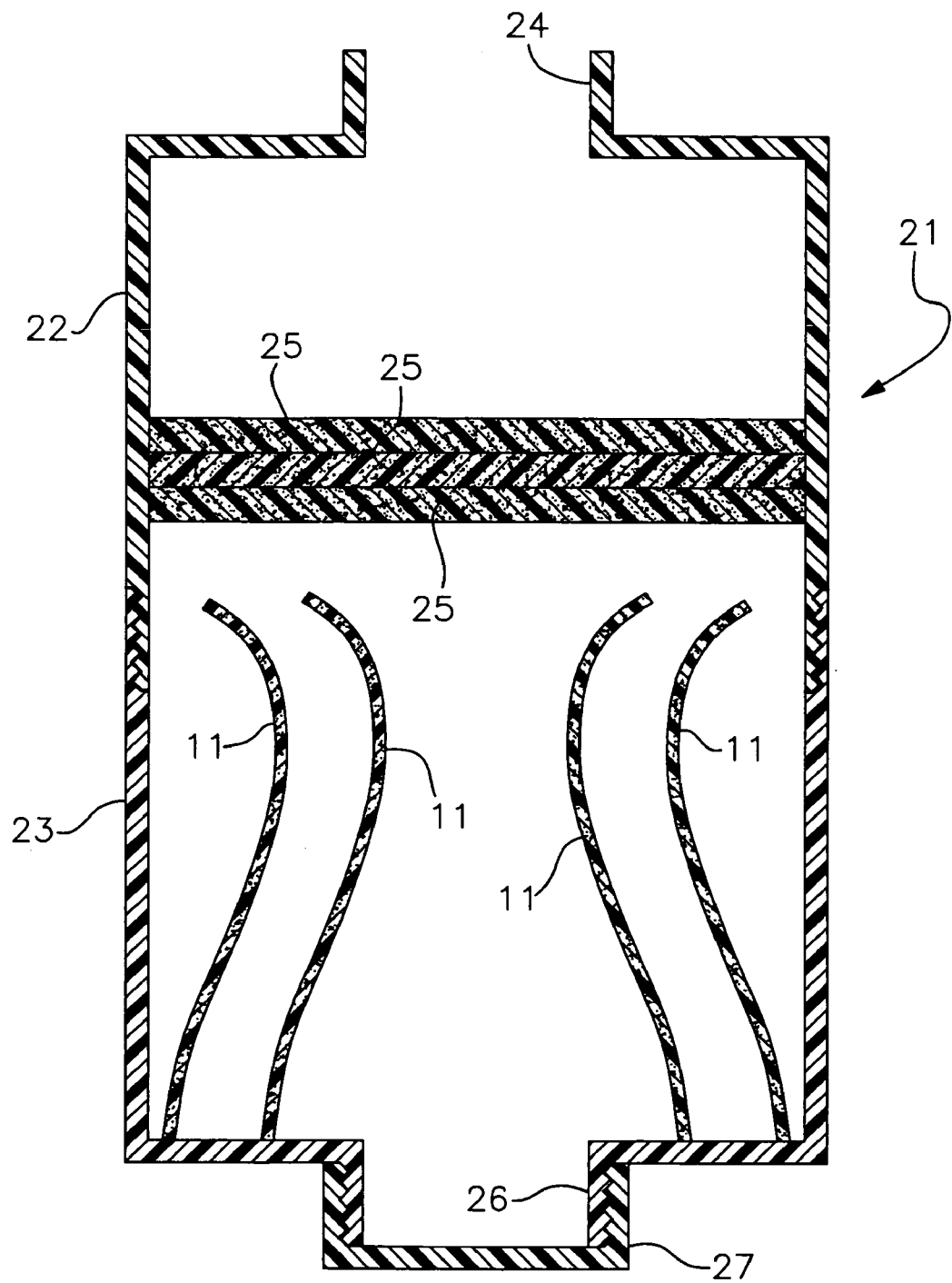
FIG. 3 is an illustration of another embodiment of the invention, showing a container with one or more filtration members along with carrier substrates bearing a silane-based, non-leaching antimicrobial.

A more complex container 21 is shown in FIG. 3. This container 21 is separable, having an upper portion 22 and a lower portion 23 joined in by threading or equivalent means such that the two portions 22 and 23 can be separated. An inlet 24 to receive the contaminated water 99 is provided in the upper portion 22. One or more filtration members 25 are disposed in the upper portion 22, such that water 99 passes through the filtration members 25 into the lower portion. The filtration members 25 remove particulate matter or other specific contaminants when the water 99 is poured into the inlet 24 prior to the water's passage into the lower portion 23. The lower portion 23 defines the treatment chamber, with the carriers or substrates 11 bearing the silane-based antimicrobial agents disposed and retained therein. An outlet 26 is provided in the base of the lower portion 23, the outlet 26 being sealed for example by a removable cap 27. Alternatively, the outlet 26 could comprise a valve member. After sufficient residence time for eradication of the microbes in the water, preferably with intermittent agitation, the cap 27 is removed to release the potable water 99. The structure of this container 21 allows the filtration members 25 to be back-flushed to remove particulate build-up, and allows for easy replacement of the filtration members 25 and carriers 11.

It is understood that equivalents and substitutions for certain elements set forth above may be obvious to those skilled in the art, and therefore the true definition and scope of the invention is to be as set forth in the following claims.

We claim:

1. A method of eradicating microbes in water comprising the steps of:
   providing a container to receive microbe contaminated water;
   providing within the container a filter member;
   providing within the container a carrier bearing an efficacious amount of a chemically-bound, non-leaching, silane-based antimicrobial agent, the carrier comprising at least one strip of synthetic fibers attached to the container such that the carrier extends into the water;
   passing the water through the filter member to remove particulate matter;
   exposing the water to the carrier;
   allowing the water to remain in contact with the carrier a sufficient resident time for eradication of the microbes.

2. The method of claim 1, wherein said antimicrobial agent is 3-(trimethoxysilyl) propyldimethyloctadecyl ammonium chloride.

3. The method of claim 2, further comprising the step of agitating the water after the step of exposing the water to the carrier.

4. The method of claim 1, further comprising the step of agitating the water after the step of exposing the water to the carrier.

5. A method of eradicating microbes in water comprising the steps of:
   providing a container to receive microbe contaminated water;
   providing within the container a filter member;
   providing within the container a carrier bearing an efficacious amount of a chemically-bound, non-leaching, silane-based antimicrobial agent, the carrier comprising at least one strip of synthetic fibers attached to the container such that the carrier extends into the water;
   passing the water through the filter member to remove particulate matter;
   exposing the water to the carrier in a non-continuous flow, batch mode whereby individual quantities of water are purified;
   allowing the water to remain in contact with the carrier a sufficient resident time for eradication of the microbes.

6. The method of claim 5, wherein said antimicrobial agent is 3-(trimethoxysilyl) propyldimethyloctadecyl ammonium chloride.

7. The method of claim 6, further comprising the step of agitating the water after the step of exposing the water to the carrier.

8. The method of claim 5, further comprising the step of agitating the water after the step of exposing the water to the carrier.

9. A method of eradicating microbes in water comprising the steps of:
   providing a container to receive microbe contaminated water;
   providing within the container an immersion member comprising a body composed of a material that floats or sinks in the water, and a carrier bearing an efficacious amount of a chemically-bound, non-leaching, silane-based antimicrobial agent, the carrier comprising at least one strip of synthetic fibers attached to the body such that the at least one strip extends into the water;
   exposing the water to the carrier in a non-continuous flow, batch mode whereby individual quantities of water are purified;
   allowing the water to remain in contact with the carrier a sufficient resident time for eradication of the microbes.

10. The method of claim 9, wherein said antimicrobial agent is 3-(trimethoxysilyl) propyldimethyloctadecyl ammonium chloride.

11. The method of claim 10, further comprising the steps of providing within the container a filter member and passing the water through the filter member to remove particulate matter prior to exposing the water to the carrier.

12. The method of claim 10, wherein the body floats in the water.

13. The method of claim 12, further comprising the steps of providing within the container a filter member and passing the water through the filter member to remove particulate matter prior to exposing the water to the carrier.

14. The method of claim 10, wherein the body sinks in the water.

15. The method of claim 14, further comprising the steps of providing within the container a filter member and passing the water through the filter member to remove particulate matter prior to exposing the water to the carrier.

16. The method of claim 9, wherein the body floats in the water.

17. The method of claim 16, further comprising the steps of providing within the container a filter member and passing the water through the filter member to remove particulate matter prior to exposing the water to the carrier.

18. The method of claim 9, wherein the body sinks in the water.

19. The method of claim 18, further comprising the steps of providing within the container a filter member and passing the water through the filter member to remove particulate matter prior to exposing the water to the carrier.

20. The method of claim 9, further comprising the steps of providing within the container a filter member and passing the water through the filter member to remove particulate matter prior to exposing the water to the carrier.

* * * * *